Patented Mar. 18, 1941

2,235,161

UNITED STATES PATENT OFFICE 2,235,161

LUBRICANT CAPABLE OF CARRYING HEAVY LOADS

Arnold J. Morway, Roselle, and John C. Zimmer, Hillside, N. J., assignors to Standard Oil Development Company, a corporation of Delaware No Drawing. Application September 20, 1938, Serial No. 230,784

15 Claims. (Cl. 252—48)

The present invention relates to lubricants and more especially to lubricants capable of carrying heavy loads. The invention will be fully understood from the following description.

Sulfur has been long used as an ingredient of lubricants capable of carrying heavy loads such as extreme pressure gear lubrication, cutting, stamping, drawing or other metal working operations. There are many objections to the use of free sulfur which have long been known, one of these being the relatively large amount of sulfur necessary for the purpose. Another objection is that while free flowing oils containing suspended sulfur may be prepared, many of the lubricating operations occur at temperatures above the melting point of sulfur and the small dispersed particles of sulfur fuse together during the process and recrystallize into larger particles which readily settle out.

It has been found that excellent lubricants for the above purposes can be prepared by the use of various phosphorus sulfides or mixtures of the same which are made by heating red phosphorus and sulfur together at an elevated temperature. These products are yellow salts melting at temperatures from about 340° to 520° F., depending on the relative content of phosphorus and sulfur. They may contain some free red phosphorus and may be derived by heating for several hours at 350° F. in a current of carbon dioxide. Purification may also be effected by recrystallization from suitable solvents such as carbon disulfide.

Of the various sulfides of phosphorus, the so-called sesquisulfide, that is to say tetraphosphorus trisulfide, $P_4S_3$, is the most desirable. This is prepared as described above, heating red phosphorus and sulfur preferably to about 625° F. in a current of carbon dioxide. The ingredients should be used in the proportions called for by the formula, that is to say 4 atoms of phosphorus to 3 of sulfur or preferably in about equal weights, which would provide a slight excess of sulfur. It is found desirable to remove any excess of free phosphorus after the combination has taken place by the methods referred to above.

The solid phosphorus sulfides, and particularly the sesquisulfide, are then reduced to a finely divided condition preferably within the range from .01 to 1.0 mm. in diameter. The material may be, of course, more finely divided, but it has been found that this is sufficiently fine to provide a reasonably stable dispersion in mineral lubricating oils. It is desirable, however, to provide a dispersing agent to stabilize the mixture and for that purpose it has been found that solid waxes are the most desirable; among these carnauba wax, beeswax, montan wax or other natural or synthetic waxes may be employed. However, small percentages of soaps of strong bases such as sodium, potassium or calcium oleate may also be used for this purpose as well as cellulose ethers or esters such as cellulose trilanate. In making up a suitable dispersion, about 1 to 3% of the wax is dissolved in mineral lubricating oil by heating to 200 to 250° F. while thoroughly stirring. The mixture is then allowed to cool without agitation to about room temperature and the phosphorus sulfide in finely divided condition is then added. The amount of this product is ordinarily from .05 to 2.0%. The dispersing agent is ordinarily in proportion from about .1 to 3.0%, as indicated before, depending on the particle size, viscosity of the lubricating oil and other factors which will be appreciated by those skilled in the art. The mixture may then be passed through some emulsifying or homogenizing machine to more thoroughly mix the various ingredients. Concentrates containing from 3 to 10% of the sulfide may be prepared and may then be diluted with mineral oil when they are to be used. The amount of phosphorus sulfide in the finished product depends to some extent on the use to which it is to be applied. For cutting oils, the amount may be as little as .1% of phosphorus sesquisulfide, but in some instances as much as .05 to 5% may be desirable.

The above described products are particularly useful in metal working operations or high pressure gear lubrication and may be made free flowing as described, using the wax dispersing agents. Other ingredients may, of course, be added for specific purposes. Heavy metal soap such as lead, zinc chromium oleates or naphthenates also enhance load carrying power and are used in proportions of 5 to 10% of the total mixture. The sulfides of phosphorus are likewise adapted for use in solid or semi-solid greases; in such products wax dispersing agents are useful but are not so necessary as in the free flowing lubricants.

The following examples will illustrate the composition and the nature of the present lubricants.

Example I

Three parts by weight of carnauba wax were dissolved in a light mineral lubricating oil by heating and stirring to 250° F. The mixture was then cooled to room temperature without further agitation and one part by weight of commercial phosphorus sesquisulfide of a particle size between .01 and 1.0 mm. was added and stirred in cold. The mixture was then passed through an emulsifying machine of the high pressure-low speed-piston type, in order to further stabilize the mixture.

The blend was then tested on an Almen machine and carried the full 15 weights, that is to say 15,000 pounds per square inch when rapidly loaded under shock conditions which, as will be appreciated, is a much more severe test than when the weights are added slowly according to the normal procedure of the test. Friction was low in both cases and little heat was generated. Test pins after the test were still in excellent condition. The product was free flowing, and after nine months' storage at room temperature no indication of sulfide separation or settling was noted, except for a slight layer about 1/8" at the top of the vessel.

*Example II*

The product of Example I which contained about 1% of the sulfide was now diluted with approximately nine volumes of the same lubricating oil which had been used in its manufacture. This blend then contained approximately .10% of phosphorus sesquisulfide and .30% of carnauba wax. The material was free flowing and stable and showed little tendency to settle out even for longer periods.

The Almen test on this material showed that even in dilute condition it was capable of carrying 11 weights, that is 11,000 pounds per square inch, when the loading was rapid under shock conditions, giving low friction and good pin condition. The product also carried the full 15 weights of the test when loaded gradually in the normal manner specified by the test procedure.

The present invention is not to be limited to any theory of the mechanism of the reaction nor to any particular sulfide of phosphorus or mixture thereof, but only to the following claims in which it is desired to claim all novelty inherent in the invention.

We claim:

1. An improved lubricant comprising a dispersion of a sulfide of phosphorus in mineral lubricating oil.

2. An improved lubricant comprising a mineral lubricating oil, a phosphorus sulfide dispersed therethru and a stabilizing agent.

3. An improved lubricant comprising a mineral lubricating oil, .05 to about 5.0% of a sulfide of phosphorus and a waxy stabilizing agent.

4. An improved lubricating oil comprising a mineral lubricating oil and a dispersion of finely devided phosphorus sesquisulfide.

5. An improved lubricant comprising a mineral lubricating oil, finely divided phosphorus sesquisulfide dispersed therethru and a waxy stabilizing agent.

6. An improved lubricant comprising a mineral lubricating oil, and finely divided phosphorus sesquisulfide dispersed therethru in proportion of .05 to about 5.0%.

7. An improved lubricant comprising a mineral lubricating oil, finely divided phosphorus sesquisulfide dispersed therethru and a dispersing agent, the latter two ingredients being present in proportions of from .05 to 2% and .1 to 3.0% respectively.

8. Product according to claim 7 in which the dispersing agent is carnauba wax.

9. Product according to claim 7 in which the dispersing agent is montan wax.

10. An improved lubricant comprising a mineral lubricating oil, a finely divided phosphorus sesquisulphide dispersed therethru and a metal soap.

11. Product according to claim 10 in which the soap is a soap of a strong base.

12. Product according to claim 10 in which the soap is the soap of a heavy metal.

13. An improved method for making lubricants comprising heating mineral oil and dissolving a dispersing agent therein while hot, then cooling without agitation and thereafter incorporating a finely divided solid sulfide of phosphorus.

14. Process according to claim 13 in which a waxy dispersing agent is dissolved in hot mineral oil, mixture is then cooled and thereafter finely divided phosphorus sesquisulphide is dispersed therethru.

15. An improved lubricant comprising a mineral lubricating oil containing a phosphorus sulfide suspended therein in the form of particles having a diameter between the approximate limits of 0.01 to 1.0 mm.

ARNOLD J. MORWAY.
JOHN C. ZIMMER.